United States Patent [19]

Muscariello

[11] 4,260,447
[45] Apr. 7, 1981

[54] CONTINUOUS BAG SEALING MACHINE
[75] Inventor: Tullio Muscariello, Elmsford, N.Y.
[73] Assignee: Save-O-Seal, Elmsford, N.Y.
[21] Appl. No.: 31,980
[22] Filed: Apr. 20, 1979
[51] Int. Cl.³ .............................................. B32B 31/20
[52] U.S. Cl. ..................................... 156/494; 53/372;
53/373; 156/497; 156/498; 156/499; 156/510
[58] Field of Search ............... 156/160, 229, 217, 218,
156/465, 466, 494, 497, 498, 499, 555, 510;
53/372, 373, 387, 388

[56] References Cited
U.S. PATENT DOCUMENTS

| | | | |
|---|---|---|---|
| 2,011,198 | 8/1935 | Morey | 53/373 |
| 2,423,237 | 7/1947 | Haslacher | 156/497 |
| 2,606,850 | 8/1952 | Piazze | 156/499 |
| 3,011,295 | 12/1961 | Brugger | 53/372 |
| 3,278,358 | 10/1966 | Rosewicz | 156/497 |
| 3,340,678 | 9/1967 | Rhodes | 156/497 |
| 3,381,448 | 5/1968 | Ayres et al. | 53/373 |
| 3,417,543 | 12/1968 | Jones | 53/372 |
| 3,488,244 | 1/1970 | Lepisto | 156/497 |
| 3,488,914 | 1/1970 | Csernak | 53/373 |
| 3,520,106 | 7/1970 | Aalpoel | 53/373 |
| 3,633,333 | 1/1972 | Schlemmer et al. | 156/497 |
| 3,861,123 | 1/1975 | Eburn et al. | 53/372 |
| 3,953,272 | 4/1976 | Webber | 156/499 |

Primary Examiner—Caleb Weston
Attorney, Agent, or Firm—Hopgood, Calimafde, Kalil, Blaustein and Lieberman

[57] ABSTRACT

A continuous bag sealing machine for heat sealable bags is provided. The machine includes a conveyor belt upon which the bag to be sealed is moved. The upper portion of the bag is gripped by a double pair of "V" belts and is moved through the machine to a hot air nozzle which fuses and seals the top of the bag. As the bag is heated, it is simultaneously stretched to more securely fuse the bag together. A cool air nozzle hardens the seal and a cutting device cuts off the top of the bag. One pair of "V" belts transport the cut-off scrap of the bag out of the device.

12 Claims, 4 Drawing Figures

FIG. I.

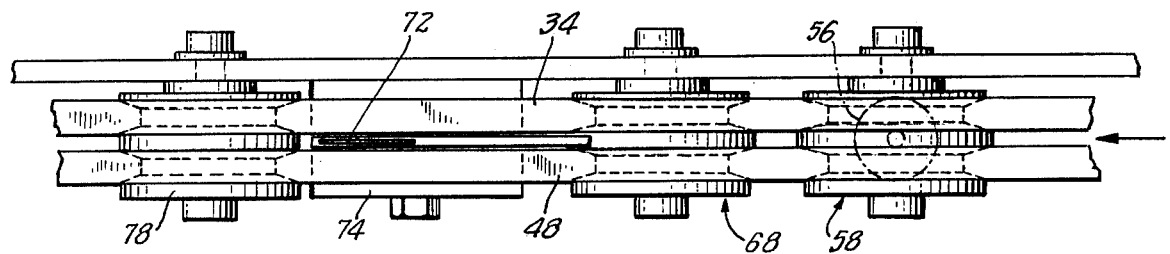
FIG. 2.
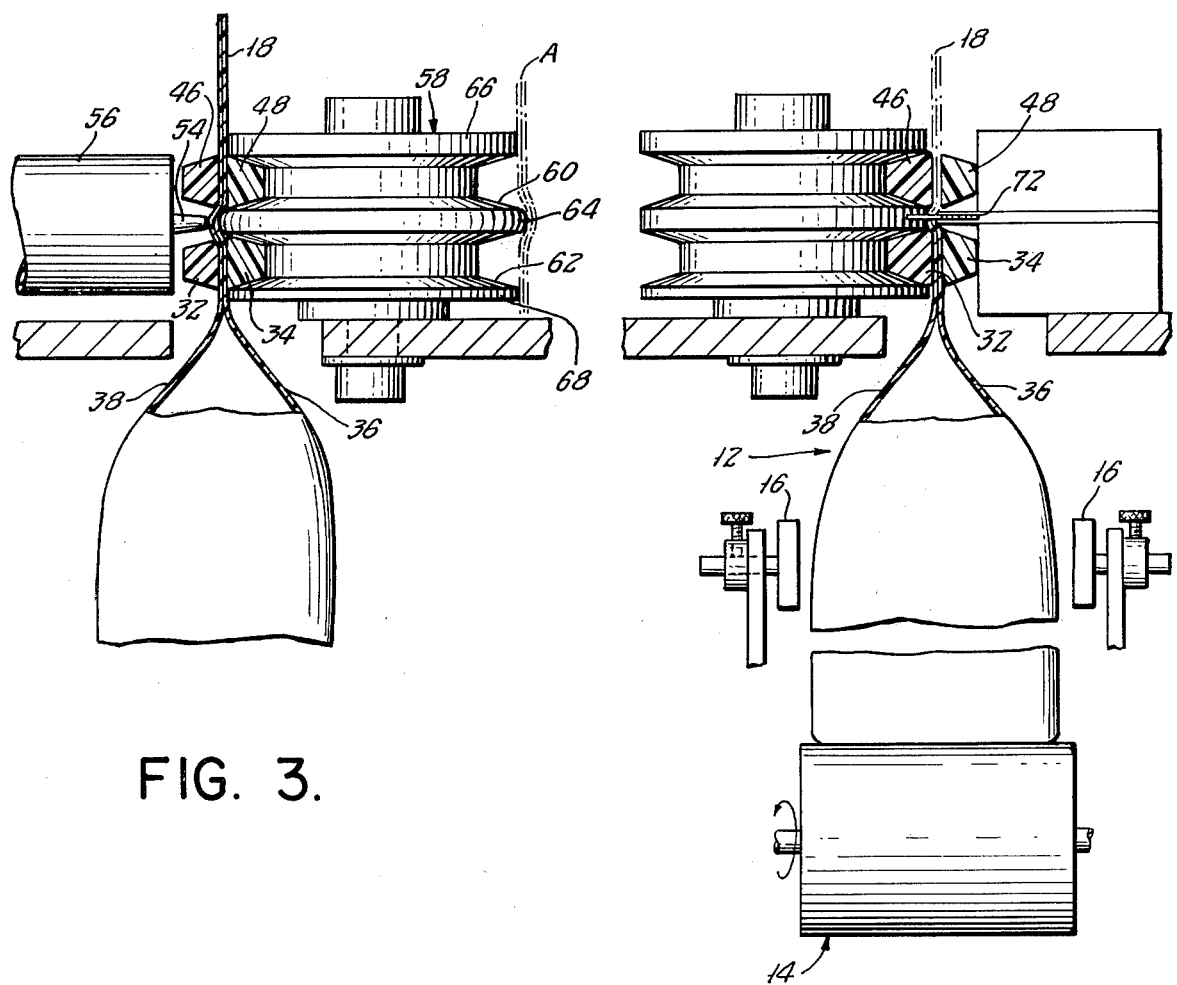
FIG. 3.
FIG. 4.

CONTINUOUS BAG SEALING MACHINE

BACKGROUND AND SUMMARY OF THE INVENTION

This invention relates generally to a machine for sealing the tops of heat sealable bags on a continuous basis. While a number of such devices are known in the art, many such devices provide a seal that is less than completely satisfactory, since the seal may be less than completely fused. A number of other machines are known in the art for providing a reliable seal. However, many of these machines require complex folding and heating operations which seriously impede the speed of operation of the machine, as well as being mechanically complex and thus excessively expensive. The present invention is directed to overcoming these difficulties.

Generally speaking, in accordance with the invention, an improved continuous bag sealing machines for heat sealable bags is provided. The machine includes a conveyor belt for conveying the bag to be sealed to the machine. The upper portion of the bag to be sealed is engaged by two pairs of "V" belts on each side of the bag. The belts transport the bag through a hot air gun and special pulley which fuse and seal the top of the bag while simultaneously stretching it. A cold air jet and a device for cutting off the top of the bag are also provided. The cut off top of the bag is transported by the second pair of "V" belts out of the cutting area of the machine for disposal.

Accordingly, it is an object of this invention to provide an improved continuous sealing machine for heat sealable bags.

It is a further object of this invention to provide an improved heat sealing machine that provides a highly reliable and fused seal.

It is a further object of this invention to provide an improved heat sealing machine that cuts off the unused portion of the bag.

It is a further object of this invention to provide an improved heat sealing machine that has means for transporting the cut off portion of the bag outside of the machine.

It is another object of this invention to provide an improved heat sealing machine that is relatively simple and economical to manufacture, assemble and repair.

Still other objects of this invention will become apparent upon a reading of the detailed specification to follow.

BRIEF DESCRIPTION OF THE DRAWINGS

In order to better understand the invention, reference is made to the following drawings, taken in connection with the detailed specification to follow:

FIG. 2 is a sectional view taken along line 2—2 of FIG. 1;

FIG. 3 is a sectional view taken along line 3—3 of FIG. 1; and

FIG. 4 is a sectional view taken along line 4—4 of FIG. 1.

DESCRIPTION OF THE PREFERRED EMBODIMENT

Figure 1:
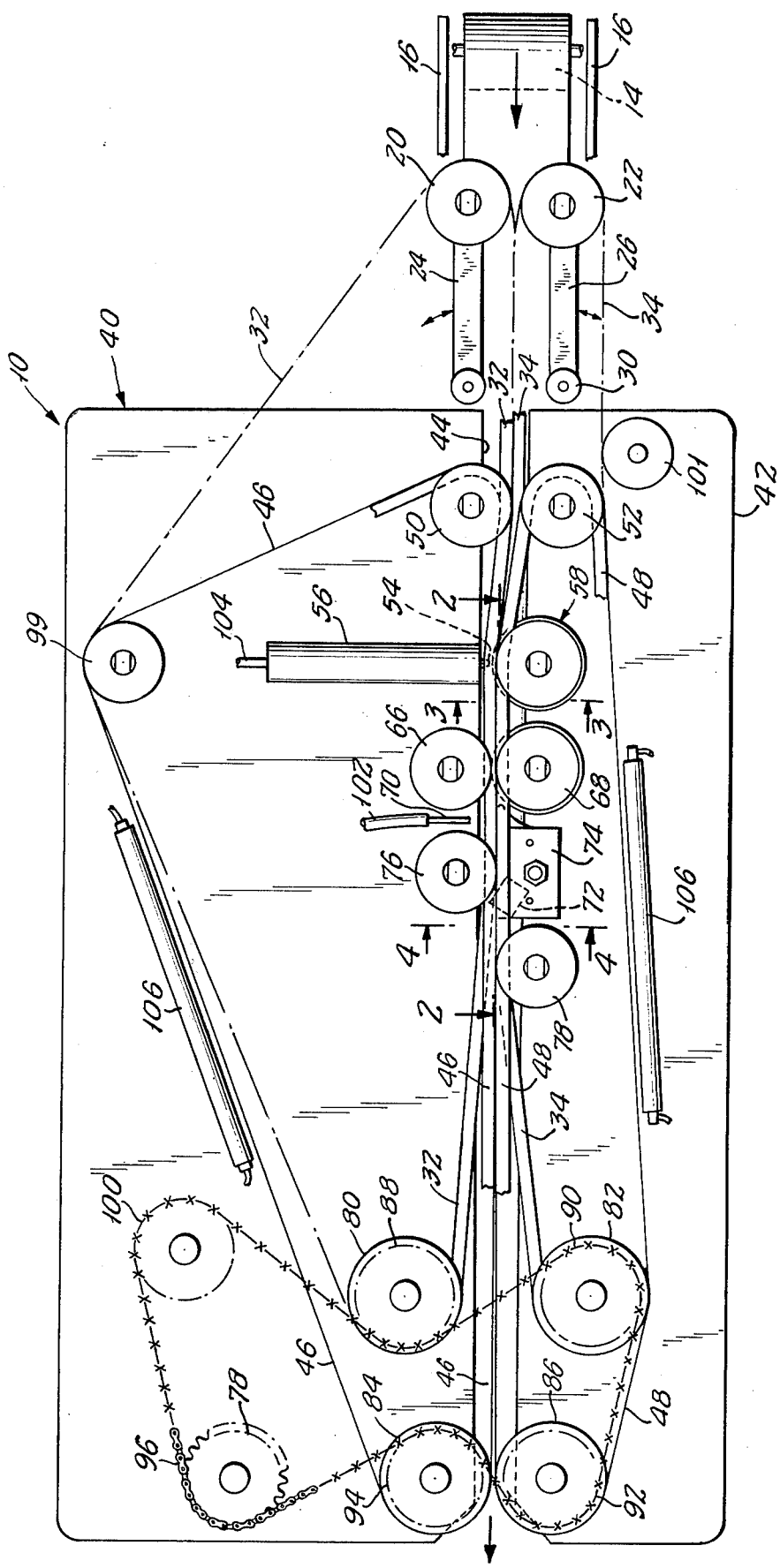
FIG. 1 is a plan view of the continuous bag sealing machine constructed in accordance with the instant invention.

The drawings illustrate a continuous bag sealing machine 10 for sealing a heat sealable bag 12. Bag 12 enters sealing machine 10 by way of an endless conveyor belt 14 and is prevented from tipping over by guiderails 16 located on each side of bag 12. As bag 12 approaches machine 10, the upper portion 18 of bag 12 is engaged by a pair of belt-carrying pulleys 20, 22 located on each side of bag 12. The vertical position of conveyor belt 14 beneath the other elements of machine 10 may be adjusted to accommodate varying heights of bag 12. Each pulley 20, 22 is mounted on a spring loaded arm 24, 26 which pivots about the points 28, 30 to permit pulleys 20, 22 to accommodate varying widths of upper portions 18 of bag 12. Pulleys 20, 22 each carry a first, lower "V" belt 32, 34, respectively, which will engage on opposite sides portion 18 of bag 12. The outer wider face of belts 32, 34 will engage and hold together the individual layers 36, 38 of upper portion 18 of the bag 12.

Machine 10 includes frame halves 40, 42 upon which the majority of its operative elements are mounted. The space between frame portions 40, 42 defines a channel 44 through which bag 12 is moved by conveyor belt 14 as it is sealed. As bag 12 moves through channel 44 in engagement with belts 32, 34 it will further be engaged by a second pair of belts 46, 48 carried by pulleys 50, 52, respectively. Pulleys 50, 52 are double pulleys which carry a pair of "V" shaped grooves in which belts 32, 34 ride in the lower groove and belts 46, 48 are carried by the upper grooves. Belts 48, 46 will also engage layers 36, 38 of portion 18 of bag 12 to hold same. Thus, as bag 12 progresses beyond pulleys 50, 52 it will be engaged by four belts 32, 34 and 46, 48 with a space between the upper and lower belts.

As shown in FIG. 3, bag 12 will then be moved in position to a nozzle 54 mounted in tube 56 in which a heating element such as an electric wire (not shown) will cause a stream of gas, such as air, flowing through nozzle 54 to become heated to a temperature suitable to melt the plastic material of bag 12. Simultaneous with the heating of leaves 36, 38 of upper portion 18 of bag 12 is the engagement of same by pulley 58 which includes "V" shaped grooves 60, 62 for engagement with belts 34, 48 and a central flange 64 which has a curved outer edge extending a distance "A" beyond upper and lower flanges 66, 68. As seen in FIG. 3, flange 64 simultaneously stretches leaves 36, 38 of bag 12 while it is heated by nozzle 54. This stretching and simultaneous heating causes leaves 36, 38 to fuse together, forming a seal that is more secure than that of conventional sealing machines.

After the heating and the stretching of bag 12 which forms a seal-line across section 18 thereof, it will be passed through a further pair of double pulleys 66, 68 to a cooling jet 70 which directs a flow of cool air along the seam formed by nozzle 54 and flange 64 to cause the fused seam to harden. After cooling at nozzle 70, the excess portion of the bag above the seam-line will be cut off by a cutting blade 72 mounted to block 74 which in turn is mounted to frame portion 42. As seen in FIG. 4, blade 72 extends between upper belts 32, 34 and lower belts 46, 48 and beyond the center line of channel 44 in order to provide a smooth cut of portion 18 of bag 12. Pulleys 76, 78 located opposite from and, after blade 72 aid in the cutting of bag 12 by firmly holding bag 12 in position.

After contacting pulleys 76, 74 lower belts 32, 34 pass around pulleys 80, 82, respectively. Pulleys 80, 82 are positioned so that lower belts 32, 34 diverge away from bag 12. However, upper belts 46, 48 pass over pulleys 84, 86 which are arranged so that they do not diverge. Thus, the now cut off upper portion 18 of bag 12 will be held between upper belts 46, 48 so that it may be delivered to suitable equipment for removal thereof. The removal equipment (not shown) is positioned at point "B" at the end of the device and may consist of a vacuum suction device to remove portion 18. After passing through pulleys 84, 86 bag 12 will continue to be moved along belt 14 to such further operations as needed.

Connected to and driving pulleys 80, 82, 84, 86 are sprocket wheels 88, 90, 92, 94, respectively. A chain drive 96 engages each of the sprockets and in turn passes over sprockets 98 and 100. Sprocket 98 is in turn driven by a suitable motor, such as electric motor (not shown) for moving each of the belts. The speed of the belts is regulated so that it is exactly the same as that of conveyor belt 14. Sprockets 88, 90, 92, 94 are spaced a suitable distance above pulleys 80, 82, 84, 86 so that there is clearance for the length of upper section 18 of bag 12 to pass thereunder.

Belts 32 and 46 pass over double pulley 99 before their return to pulleys 20 and 50, respectively. Pulley 101 serves to tension belt 34. Air supply lines 102, 104 supply a flow of compressed air to cooling nozzle 70 and heating nozzle 54, respectively, and are powered by a source of compressed air (not shown). The air supplied by the compressor is also routed to a pair of heat exchangers 106, 108 which abut against belts 32, 46, 48 and 34, respectively. Heat exchangers 106, 108 serve to cool the belts which may become heated by the hot air flow of nozzle 54.

In certain instances, such as where the sealing of bags having thick walls or laminated construction is desired, a second heat air jet may be used. The second jet is arranged in opposed relationship with the first nozzle so that the portion of the bag to be sealed is sealed from both sides.

It is apparent that the seaing machine of the present invention operates continuously and efficiently to provide a secure fused seal upon a variety of heat sealable bags. The invention permits the continuous sealing of such bags with a seal that has a high degree of integrity.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention, and the appended claims.

What is claimed is:

1. A continuous sealing machine for a heat sealable bag comprising:
   (a) means for transporting said bag to be sealed;
   (b) means for engaging said bag proximate to the portion of said bag which is to be sealed to hold the layers of said bag to be sealed together;
   (c) means for heating said bag along a line thereof, said line being located at the layers held together;
   (d) and pulley means for stretching said bag along said line simultaneously with said heating, said pulley means having a flange extending from the periphery thereof into engagement with said bag along said line to be sealed to fuse said layers together and thereby seal said bag.

2. The sealing machine as claimed in claim 1 wherein said means for engaging said bag comprise a pair of belt means engaging opposed sides of said bag.

3. The sealing machine as claimed in claim 2 wherein said belt means includes a second pair of belt means for engaging opposed sides of said bag, said line being located between said first and second pair of belt means.

4. The sealing machine as claimed in claim 3 wherein at least one of said pairs of belt mean diverge away from said bag after the sealing of said bag.

5. The sealing machine as claimed in claim 1 wherein said means for heating said bag comprise a nozzle supplying a stream of gas at a temperature sufficient to seal said bag.

6. The sealing machine as claimed in claim 1 further including means for cutting said bag above the line of seal.

7. The machine as claimed in claim 6 wherein said cutting means comprise a knife engaging said bag.

8. The machine as claimed in claim 1 further including means for cooling said seal after said bag is heated.

9. The machine as claimed in claim 8 wherein said cooling means comprise a jet of gas at a temperature sufficient to cool said previously heated bag.

10. A continuous sealing machine for a heat sealable bag comprising:
    (a) first and second pairs of movable belt means each pair of belt means engaging opposite sides of said bag to thereby grasp said bag therebetween;
    (b) pulley means along which said belt means are driven;
    (c) drive means coupled to said pulley means to drive said pulleys at a constant speed to thereby displace said belt and said bag;
    (d) said pulley means including at least one stretching pulley, said stretching pulley including first and second grooves, one belt of said first pair of belt means riding in said first groove, one belt of said second pair of belt means riding in said second groove;
    (e) a flange disposed on said stretching pulley between said first and second grooves, said flange extending beyond the belts carried in said first and second grooves to thereby stretch said bag at the point of contact with said flange; and
    (f) heating gun means disposed opposite said flange, said heating gun means directing a stream of heated gas at said bag at the point of contact with said flange, said gas being at a sufficient temperature to cause said bag to fuse along the line of contact between said bag and said flange to thereby securely seal said bag.

11. The sealing machine as claimed in claim 10, further including cutting means positioned between said first and second belts to cut off the portion of said bag above said seal line after said bag has been sealed.

12. The sealing machine as claimed in claim 10 further including conveyor belt means disposed beneath said pairs of belts to support said bag, said conveyor belt moving at a speed equal to that of said belt means.

* * * * *